United States Patent
Fischperer

(10) Patent No.: US 7,362,014 B2
(45) Date of Patent: Apr. 22, 2008

(54) METHOD AND ARRANGEMENT FOR OPERATING A MAGNETICALLY LEVITATED VEHICLE

(75) Inventor: Rolf Fischperer, Berlin (DE)

(73) Assignee: Transrapid International GmbH & Co. KG, Berlin (DE)

( * ) Notice: Subject to any disclaimer, the term of this patent is extended or adjusted under 35 U.S.C. 154(b) by 145 days.

(21) Appl. No.: 11/268,369

(22) Filed: Nov. 7, 2005

(65) Prior Publication Data
US 2006/0097116 A1    May 11, 2006

(30) Foreign Application Priority Data
Nov. 10, 2004    (DE)    ................ 10 2004 054 919

(51) Int. Cl.
*H02K 41/00*    (2006.01)
(52) U.S. Cl. ................. 310/12; 310/13; 104/289; 318/135
(58) Field of Classification Search ............ 310/12–13; 318/38, 135; 104/290–294; 1/286
See application file for complete search history.

(56) References Cited

U.S. PATENT DOCUMENTS

| | | | |
|---|---|---|---|
| 4,068,152 A * | 1/1978 | Nakamura et al. | 318/135 |
| 4,348,618 A * | 9/1982 | Nakamura et al. | 318/38 |
| 4,360,748 A | 11/1982 | Raschbichler et al. | |
| 4,361,095 A | 11/1982 | Gibson | |
| 4,454,457 A * | 6/1984 | Nakamura et al. | 318/135 |
| 4,636,667 A | 1/1987 | Holzinger et al. | |
| 4,665,329 A * | 5/1987 | Raschbichler | 310/13 |
| 4,728,382 A * | 3/1988 | Raschbichler | 156/264 |
| 5,053,654 A * | 10/1991 | Augsburger et al. | 310/12 |
| 5,125,347 A | 6/1992 | Takashi et al. | |
| 5,569,987 A | 10/1996 | Fischperer et al. | |
| 5,712,514 A | 1/1998 | Fischperer et al. | |
| 6,087,790 A * | 7/2000 | Fischperer | 318/135 |
| 6,286,434 B1 * | 9/2001 | Fischperer | 104/290 |
| 6,411,049 B1 | 6/2002 | Fischperer | |
| 6,753,666 B2 | 6/2004 | Fischperer | |

FOREIGN PATENT DOCUMENTS

DE    2932764    3/1981

(Continued)

OTHER PUBLICATIONS

Magazine Elektrotechnische Zeitschrift Etz, vol. 108, No. 9 1987, Jrgen Meins.

*Primary Examiner*—Thanh Lam
(74) *Attorney, Agent, or Firm*—Michael J. Striker

(57) ABSTRACT

The invention relates to a method and an arrangement for operating a magnetically levitated vehicle by means of an arrangement having at least one long-stator linear motor. The linear motors are sub-divided longitudinally of a track into individual motor regions (A3, A4) in which only one vehicle (7e, 7f) at a time can normally travel. To increase the vehicle concentration along the track, provision is made in accordance with the invention for selected motor regions (A4) to be divided into at least two mutually independent motor region sections (A4a, A4b) and for one vehicle (7f, 7g) to be operated in each motor region section (A4a, A4b) at a part of that power which is preset for each motor region (A4).

15 Claims, 6 Drawing Sheets

FOREIGN PATENT DOCUMENTS

| | | |
|---|---|---|
| DE | 3006382 | 8/1981 |
| DE | 3303961 | 8/1983 |
| DE | 3410119 | 10/1985 |
| DE | 19922441 | 11/2000 |
| DE | 10227253 | 10/2003 |
| JP | 59006702 | 1/1984 |
| JP | 59025502 | 2/1984 |

* cited by examiner

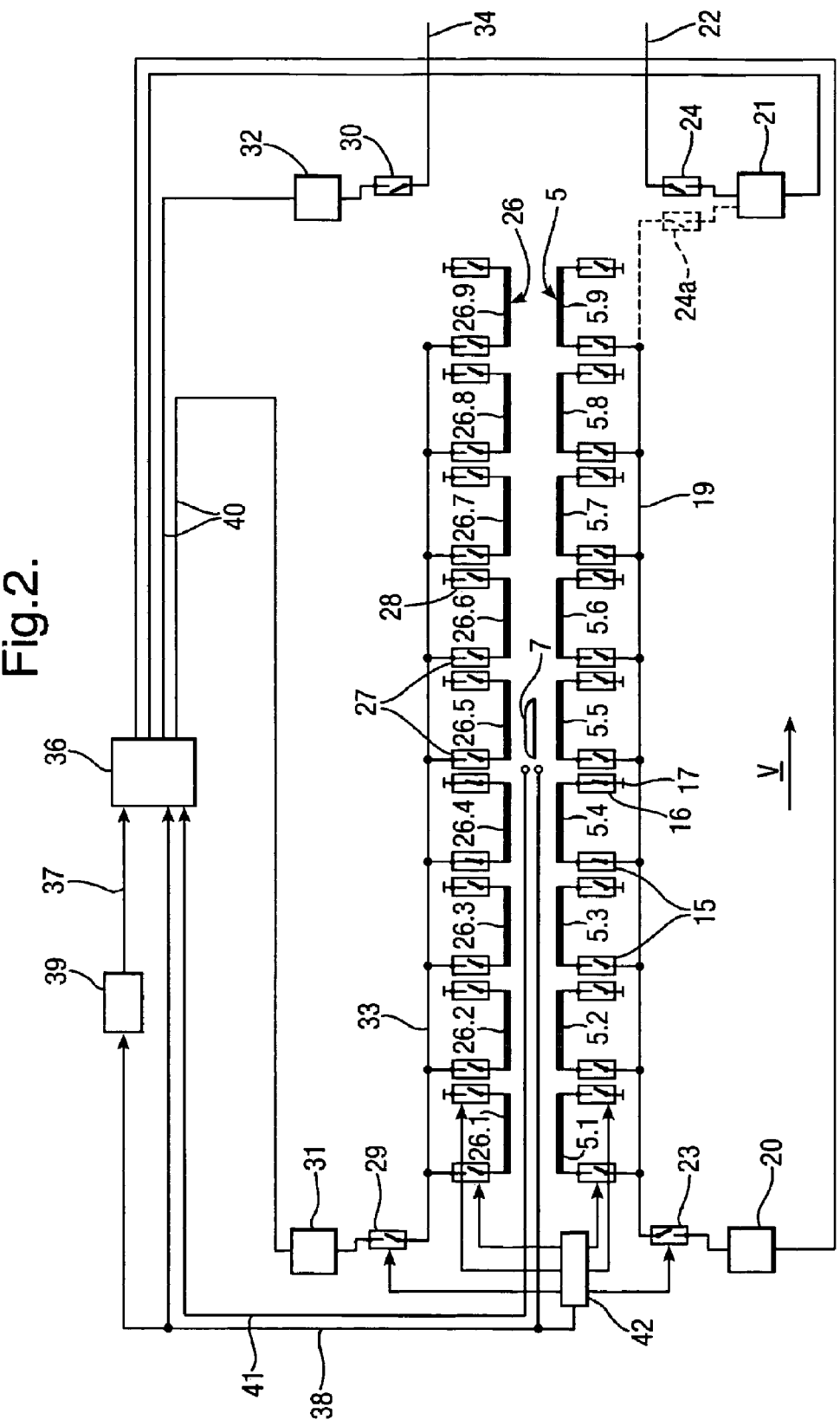

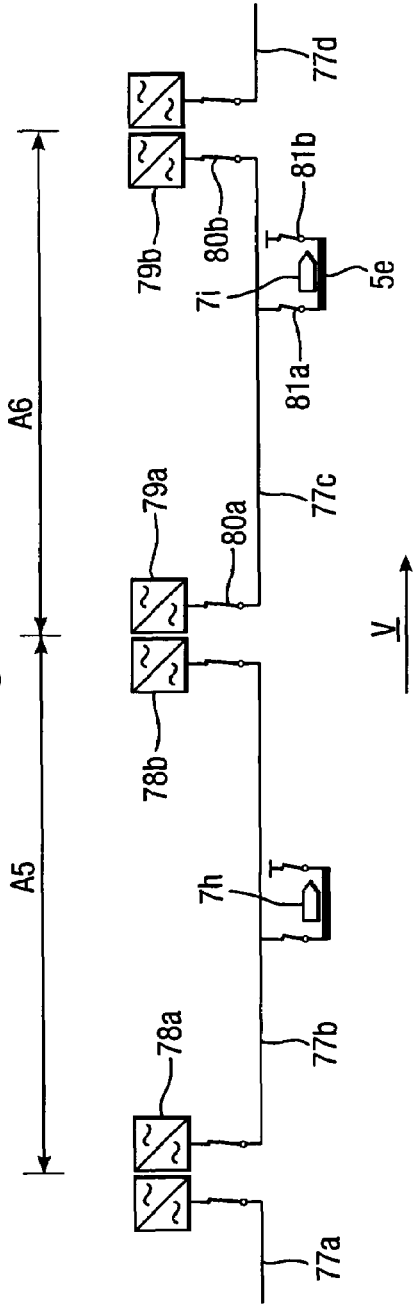
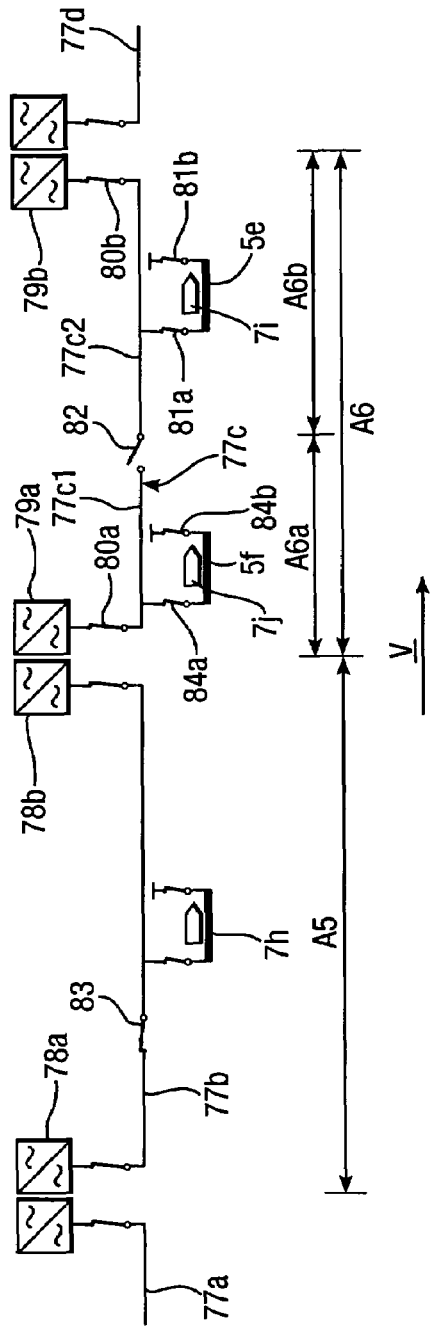
Fig.5a.
Fig.5b.

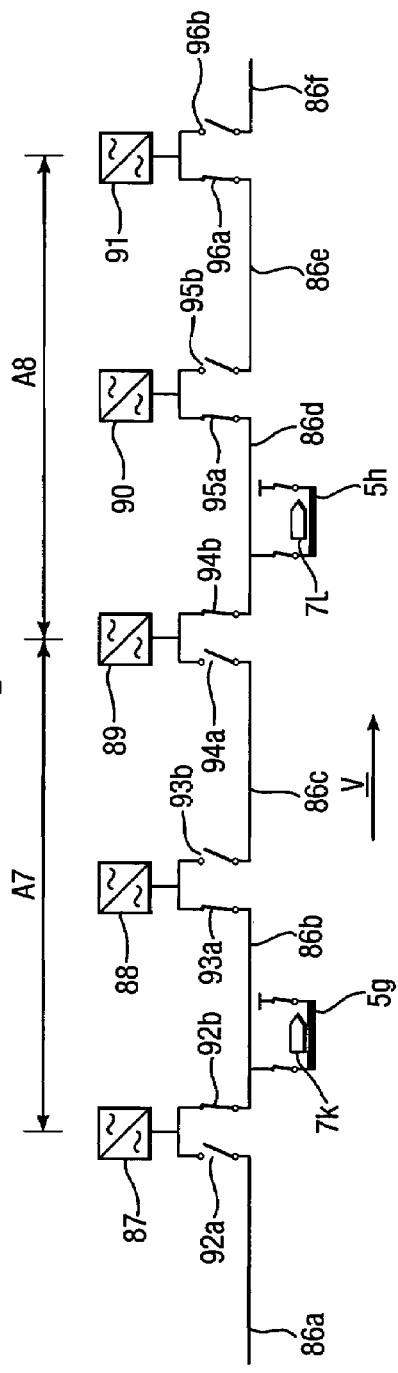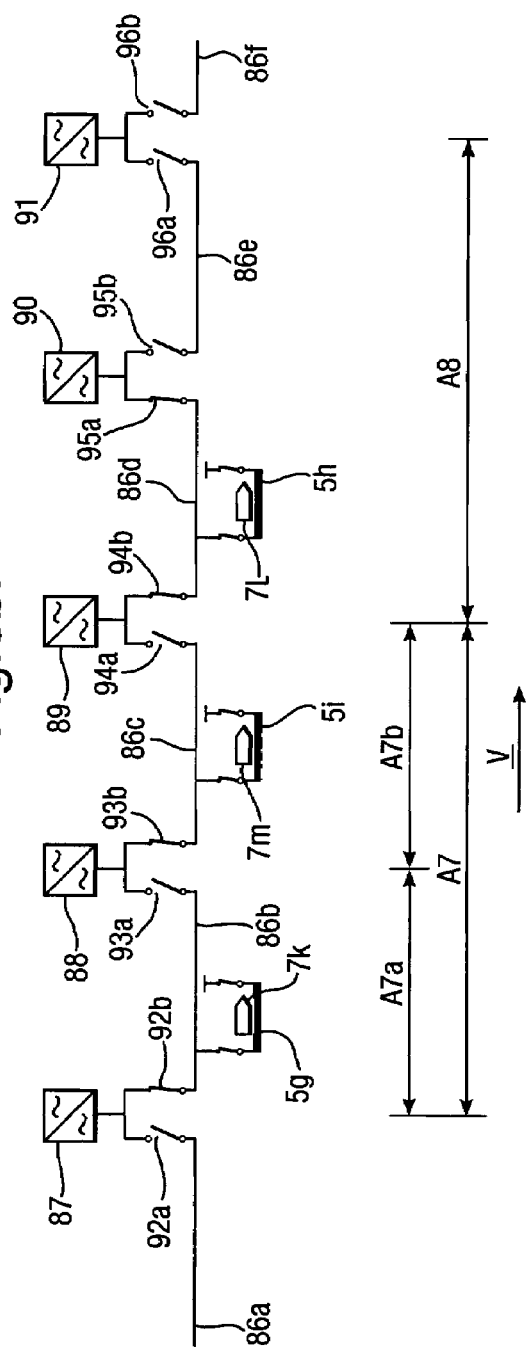

METHOD AND ARRANGEMENT FOR OPERATING A MAGNETICALLY LEVITATED VEHICLE

FIELD OF THE INVENTION

The invention relates to a method and an arrangement for operating a magnetically levitated vehicle which arrangement has at least one a.c. winding which is laid out longitudinally of a track and is sub-divided into winding sections, an exciter arrangement which is mounted on the vehicle, track-segment cables arranged longitudinally of the track and voltage sources assigned to the track-segment cables, the winding sections being connected to assigned track-segment cables and voltage sources in line with the movement of the vehicle, wherein the track-segment cables, the winding sections and the voltage sources are so assigned to motor regions which follow one another along the track that, under normal operating conditions, one vehicle is operated in each motor region at a power which is preset for the motor region and is supplied by the assigned voltage sources.

BACKGROUND OF THE INVENTION

In known methods and arrangements of this kind, use is made of long-stator linear motors (e.g. U.S. Pat. No. 5,053,654, DE 199 22 441 A1) which include, as a primary member, a long stator which is laid out longitudinally of a given track and which has at least one long-stator winding (e.g. U.S. Pat. Nos. 4,665,329, 4,728,382) in which a travelling electromagnetic field, which advances in the direction of movement of the vehicle to be operated, is generated. What acts as a secondary member on the other hand is an exciter arrangement which is mounted on the vehicle and generally extends for the entire length of the latter (e.g. DE 34 10 119 A1) and which is composed of electromagnets which also act as supporting magnets. The long-stator winding is usually sub-divided into a plurality of winding sections which are situated directly behind one another in the direction of travel, which are separated from one another electrically by changeover points and which, although at lengths of 1000 m to 2000 m for example they are comparatively short, are still considerably longer than the vehicle, which may for example be up to 250 m long. Laid out parallel to the track there are also a plurality of comparatively long (e.g. approx. 20 km long) track-segment cables (or track cables) which are connected at one end (=single feed) or at both ends (=double feed) to so-called sub-stations in which the voltage sources, in the form of converters, local control means and the like, required for supplying the long-stator winding with current and voltage are installed. To limit energy consumption and the effective impedance, it is only ever those winding sections in which the vehicle is situated at the time which are supplied with current, which is done by connecting the individual winding sections individually and in succession to assigned track-segment cables and voltage sources, with the help of switching means, in line with the movement of the vehicle. Appropriate changeover means may be provided for the connections between the track-segment cables and the voltage sources (DE 29 32 764 A1). When a magnetically levitated vehicle of this kind is being operated, the voltage sources supply voltages which are substantially equal to the sum of the voltage induced by the vehicle (inductor voltage), the voltage drop across the relevant winding section and the voltage drop across the associated part of the track-segment cable.

Because of the mode of operation which has been described, the driving means, i.e. the motor for the magnetically levitated vehicle is sub-divided into a plurality of motor regions which follow one another in the direction of the track. Each motor region contains at least one track-segment cable, winding sections assigned to the track-segment cable, and at least one voltage source connected to the track-segment cable for the supply of energy. There can in this case, for practical and technical reasons, only ever be one magnetically levitated vehicle in each motor region, i.e. a succeeding vehicle may not enter a motor region until a preceding vehicle has left the said motor region. The vehicle concentration and hence the timetable or the time intervals with which the vehicles at the maximum permitted frequency can be operated, are therefore preset by the length of a motor region and can no longer be changed once a magnetically levitated railway has been built.

In the practical application of magnetic levitation railways of this kind, a requirement has arisen for additional special journeys to be provided between the scheduled journeys and the timing of services to be made shorter, and in particular to be halved (e.g. from 10 mins to 5 mins), at least on selected parts of the track. However, with the methods and arrangements of the kind specified in the opening paragraph which have become known hitherto, this is possible, at best, by halving the length of the motor regions and doubling the number of voltage sources. This is not in any way acceptable in view of the considerable increase in the cost of installation that it involves and the fact that a need for special unscheduled journeys generally only exists for a certain time, i.e. at given times of day or when there are unforeseen traffic conditions.

SUMMARY OF THE INVENTION

Starting from the above it is an object of the invention to make it possible, with methods and arrangements specified above, to at least halve the time intervals with which the vehicles can follow along the track.

A further object of the invention is to at least halve the time intervals with which the vehicles can follow along the track without any major changes to the hardware.

Yet another object of the invention is to change the methods and arrangements specified above in such a manner that also motors already being installed can be converted in a manner to at least double the possible vehicle concentration along a given track.

The method according to the invention is characterized in that, to increase the vehicle concentration along the track, selected motor regions are sub-divided into at least two mutually independent motor region sections, and in that one vehicle is operated in each motor region section at a part of that power which is preset for each motor region.

The arrangement according to the invention is characterized in that, to increase the vehicle concentration along the track, selected motor regions can be sub-divided into at least two mutually independent motor region sections in such a way that one vehicle can be operated in each motor region section at a part of that power which is preset for each motor region.

The sub-division according to the invention of some or all of the motor regions which are designed for normal operation into at least two motor region sections of shorter length in each case involves, if the installed powers are kept as they are, a loss of power and hence a reduction in the speed of travel in the motor region sections. However, since in the case of magnetically levitated vehicles of the kind presently concerned halving the power is not equivalent to a speed which is also only half as high, the power losses which occur only in the event of special journeys can easily be tolerated. This is particularly true in view of the advantage that the increased concentrations of trains can be obtained at relatively low cost. The invention also has the advantage that it can be applied both to single-feed linear motors and to double-feed linear motors.

Further advantageous features of the invention can be seen from the sub-claims.

BRIEF DESCRIPTION OF THE DRAWINGS

The invention will be explained in detail in connection with the accompanying drawings by reference to embodiments. In the drawings:

FIG. 2 is a diagrammatic view of a known arrangement, having a single-feed long-stator linear motor, for operating a magnetically levitated vehicle as shown in FIG. 1.

FIGS. 4a, 4b and 5a, 5b and 6a, 6b are representations corresponding to FIGS. 3a and 3b of three further embodiments in accordance with the prior art and in accordance with the invention respectively.

DETAILED DESCRIPTION OF PREFERRED EMBODIMENTS OF THE INVENTION

Figure 1:
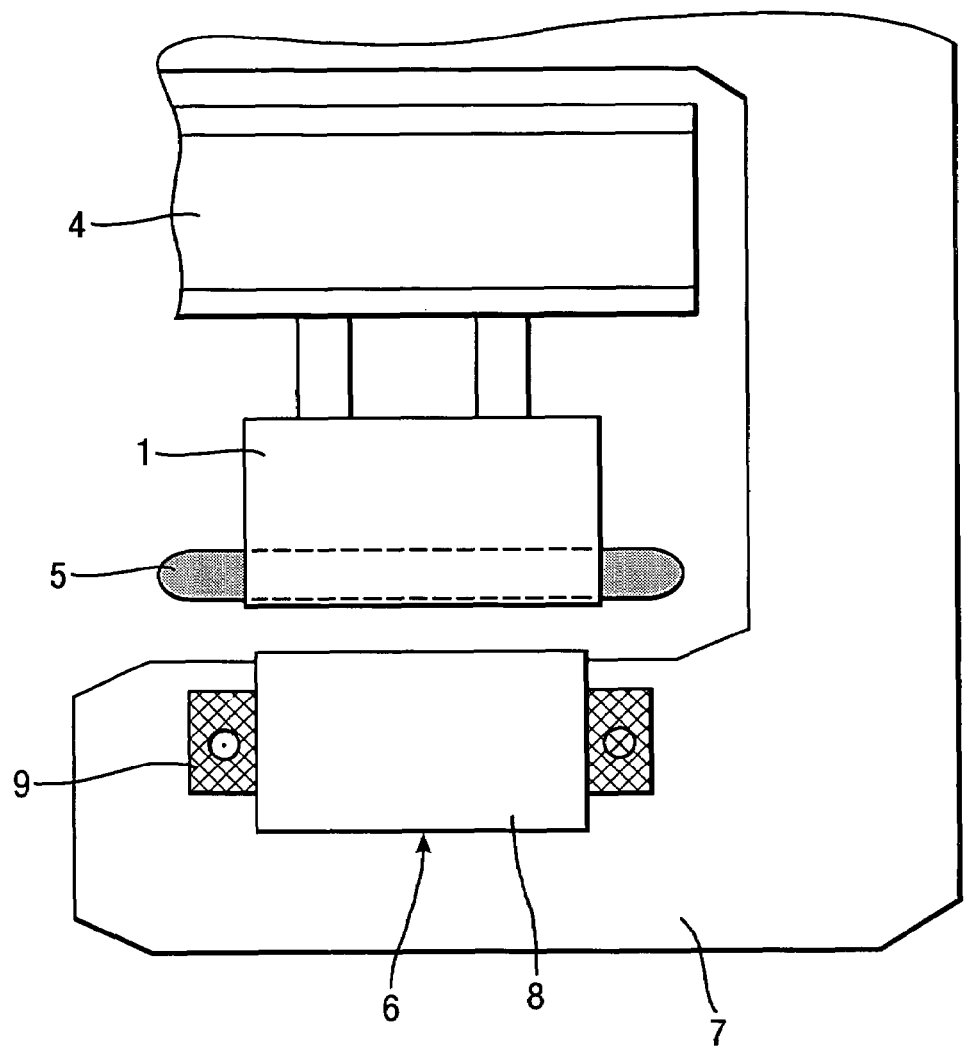
FIG. 1 is a diagrammatic cross-section through a magnetically levitated vehicle and its track, in the region of the long-stator motor.

On a magnetically levitated railway having a synchronous long-stator linear motor (FIGS. 1 and 2), a laminated stator core 1, which has a plurality of slots and teeth arranged in succession to one another, is connected in a fixed position to a track 4 which is set up along a preset route. Inserted in the slots in the laminated stator core 1 is a long-stator winding 5 in the form of a three-phase winding which is fed with three-phase current of variable amplitude and frequency by a converter, as a result of which an advancing travelling (transient) wave is set up in a known fashion longitudinally of the long-stator linear motor. The exciter field of the long-stator linear motor is generated by an exciter arrangement 6 which is formed by a plurality of magnets which are mounted on a vehicle 7, which are arranged in a distributed fashion in the latter's longitudinal direction, which at the same time perform a supporting function and which each comprise a magnet core 8 and an exciter winding 9. Further, generally a laminated stator core 1 having a long-stator winding 5, normally three-phase, and an assigned exciter arrangement 6 are provided on both sides of the track 4, with three individual windings belonging to the three phases of the three-phase current being arranged in sequence one behind the other or being interwound with one another and being for example star-connected.

To minimise the long-stator motor's demand for reactive power and for voltage, it is only that part of the long-stator winding 5 that the vehicle 7 is travelling along at that moment, e.g. in the direction of the track (arrow v), that is activated at any given time (FIG. 2). For this purpose, the long-stator winding 5, as shown diagrammatically in FIG. 2, is sub-divided into a plurality of winding sections 5.1 to 5.9 which follow one another in direct succession in the longitudinal direction of the track and each of which can be connected, via associated switching means 15 and 16, to a neutral or star point 17 and to a track-segment cable 19. At the time shown in FIG. 2, this is true of winding section 5.4. In the embodiment, one end of the track-segment cable 19 is connected to a voltage source 20. The voltage source 20 generally comprises at least one converter and is housed in a sub-station which contains at least the means required to feed the current into the winding sections 5.1 to 5.9 and also, where required, all the means which are required to control and monitor the vehicle in that region of the long-stator winding 5 which is being fed by the track-segment cable 19. Further voltage sources 21 are connected to further track-segment cables 22 which follow on along the track and by which subsequent winding sections of the linear motor can be fed in a corresponding manner. With the help of switching means 23, 24, the various voltage sources 20, 21 are activated whenever the vehicle 7 enters or leaves the section of the track which is defined by a voltage source 20, 21 or in other words by a track-segment cable 19, 22.

Since, as shown in FIG. 2, the track-segment cables 19, 22 are each connected to only one voltage source 20 and 21 respectively, this mode of operation is known as "single-feed". Alternatively however, modes of operation are also known in which there is a "double-feed", where the two ends of each track-segment cable 19 can be connected to respective voltage sources 20 or 21, as is indicated in FIG. 2 by an additional switching means 24a shown in broken lines. This variant, which is often preferred for reasons of redundancy, on the one hand allows the installed power of the voltage sources to be reduced and on the other hand means that, if one voltage source fails, the vehicle 7 will still be operated by the current supplied by the other voltage source.

Also, the winding sections 5.1 to 5.9 shown in FIG. 2 are generally used to drive only one side, e.g. the right-hand side, of the vehicle 7. Further winding sections 26.1 to 26.9, switching means 27, 28 and 29, 30, voltage sources 31 and 32 and track-segment cables 33, 34 are used in a corresponding way to drive the left-hand side of the vehicle.

To control the magnetically levitated railway which has been described, use is made of a speed, i.e. current, controller 36 to which are fed, via a line 37, desired values for the speed which the vehicle 7 is to reach or to maintain and, via a line 38 or even by radio, the signal for its current position which is transmitted by the vehicle 7. The desired values for speed are placed in store in for example a desired-value memory 39, to which the position signal is also fed and which emits a desired value of current or speed which is preset for the winding section being travelled along at the time.

The current controller 36 supplies at outputs 40 desired values which comprise for example desired values of voltage and which are fed to the voltage sources 20, 21, 31 and 32 in order to generate in the latter the voltages which are to be applied to the track-segment cables or in other words to feed into the winding sections the currents required to obtain the nominal speed. By means of the actual-value signal for speed determined on the vehicle 7, which appears on a line 41, the speed controller 36 checks that the prescribed nominal speed is being observed.

Finally, there are indicated in a simplified form in FIG. 2 control means 42 connected to the line 38, by means of which control means 42 the various switching means 15, 16, 23, 24, (24a), 29 and 30 belonging to the track section seen in FIG. 2 are controlled, as a function of the actual position of the vehicle 7 in direction $\underline{v}$, in such a way that it is always only the winding sections which are being travelled through at the time and the associated voltage sources which are connected to the different track-segment cables. Like the voltage sources 20, 21 or the like, the control means 42 may be housed in the sub-stations.

Methods and arrangements of the kind described, and their operation, are known from printed publications DE OS 29 32 764 A2, DE 30 06 382 C2, DE 33 03 961 A1, U.S. Pat. Nos. 4,665,329, 4,728,382 and 5,053,654 which, to avoid repetition, are therefore incorporated by reference in the present disclosure.

In the arrangement shown in FIG. 2, the track-segment cable 19, the voltage source 20 connected thereto, and the winding sections 5.1 to 5.9 which can be connected to the track-segment cable 19, form a unit which is referred to in what follows as a drive region or "motor region". Because the vehicle 7 shown in FIG. 2 is driven at both longitudinal sides, the track-segment cable 33, the voltage source 31 and the winding sections 26.1 to 26.9 also belong to this motor region.

Because a magnetically levitated vehicle operates in the way which has been described, only one magnetically levitated vehicle at a time can travel in a motor region. As a result, the timing depends on the length (e.g. 20 km) of the part of the track served by the track-segment cables 19 and 33 and on the speed of the vehicles. The present invention on the other hand makes it possible to have the vehicles travel on the track at twice the concentration, i.e. vehicle density along the track. This will be explained in detail below by reference to four embodiments.

Figure 3A:
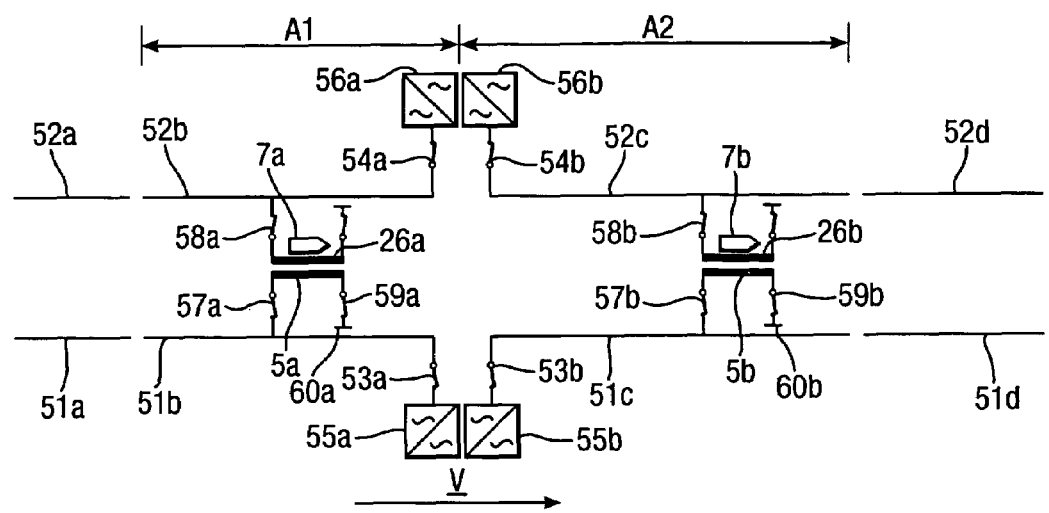
FIGS. 3a and 3b are diagrammatic representations of an embodiment of the construction of a motor region, in accordance with the prior art and in accordance with the invention respectively, when the single-feed shown in FIG. 2 is employed.

FIG. 3a shows, in diagrammatic form, a known mode of operation where the feed is single and the assignment of the converters and track-segment cables is permanent, it being assumed that vehicles 7a and 7b are moving in the direction of the arrow v. For this purpose, there are shown in the embodiment, along the track, on a right-hand side of the vehicle (at the bottom in FIG. 3a) and on a left-hand side of the vehicle (at the top in FIG. 3a) respectively, four track-segment cables 51a to 51d arranged one behind the other and four track-segment cables 52a to 52d arranged one behind the other. Each track-segment cable (e.g. 51b, 51c, 52b, 52c) can be connected to a voltage source (e.g. 55a, 55b or 56a, 56b), which is permanently assigned to it and comprises for example a converter, by means of a respective switching means (e.g. 53a, 53b, 54a, 54b). In contrast to FIG. 2, the voltage sources 55a, 55b, 56a, 56b on the one hand cannot be changed over to adjacent track-segment cables (e.g. 19 and 22 in FIG. 2) and on the other hand are not always arranged at ends which are leading in the direction of the arrow v but, for example, alternately at the leading and trailing ends of the track-segment cables, which means for example that the voltage source 55b feeds the track-segment cable 51c and the voltage source 55a feeds the track-segment cable 51b. The rest of the track-segment cables can be connected to voltage sources and winding sections in a corresponding way.

In a similar way to that shown in FIG. 2, the track-segment cables 51b, 51c, 52b, 52c can be connected to the winding sections 5.1 to 5.9 and 26.1 to 26.9 assigned to them by means of switching means 57a, 57b, 58a, 58b although for the sake of simplicity all that is shown for each of the track-segment cables 51b, 52b and 51c, 52c in FIG. 3a is a single, representative assigned winding section 5a, 26a and 5b, 26b respectively which, in a continued similarity to FIG. 2, can be connected to neutral points 60a, 60b via switching means (e.g. 59a and 59b). The rest of the track-segment cables and winding sections can be connected to voltage sources (not shown) in a corresponding way.

In normal operation, the track-segment cables 51b, 52b, together with the associated voltage sources 55a, 56a and the winding sections 5a, 26a, form a motor region A1, whereas the track-segment cables 51c, 52c, together with the voltage sources 55b, 56b and the winding sections 5b, 26b, form a motor region A2. No more than a single vehicle 7a or 7b at a time is situated in each of these motor regions A1, A2. For this reason, the switching means 53a, 53b, 54a, 54b and 57a, 57b, 58a, 58b and 59a, 59b are each in the closed state when the vehicles 7a, 7b respectively are travelling through. For the sake of simplicity, it is assumed in this case that all the vehicles 7a, 7b are operated at the same speed and, when there is a changeover from for example motor region A1 to motor region A2 there is thus no need for a change of programming for the control means 42 (FIG. 2). The rest of the track-segment cables, voltage sources or converters, and winding sections which are present along the track form motor regions which are operated in a corresponding way.

Figure 3B:
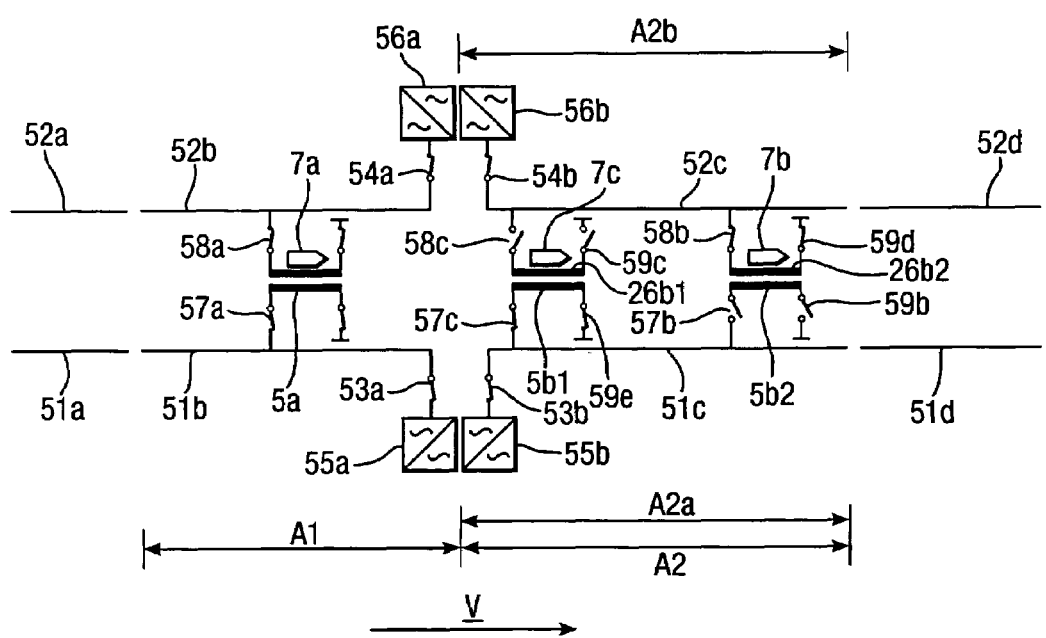

FIG. 3b, in which the same parts are given the same reference numerals as in FIG. 3a, shows a doubling, in accordance with the invention, of vehicle concentration in the motor region A2. This is possible because the motor region A2 is sub-divided into two motor region sections A2a and A2b. The motor region section A2a contains in this case the voltage source 55b, the right-hand track-segment cable 51c and the right-hand winding sections which can be connected thereto (e.g. 5b1 and 5b2), together with respective associated switching means 57c, 57b and 59e, 59b, whereas the motor region section A2b contains, in a similar way, the voltage source 56b, the left-hand track-segment cable 52c and the left-hand winding sections which can be connected thereto (e.g. 26b1 and 26b2), together with respective associated switching means 58c, 58b and 59c, 59d. Looking in the direction of the arrow v, the two motor region sections A2a and A2b are situated one beside the other. By means of the control means 42 (FIG. 2), it is ensured in this case that, when the first vehicle 7b passes through, only the left-hand switching means 58b, 59d for example are closed, whereas corresponding switching means 57b, 59b for a right-hand winding section 5b2 remain in the open state. If on the other hand a second vehicle 7c travels through the same motor region A2, then associated switching means 58c, 59c are in the open state and associated switching means 57c, 59e are in the closed state. A consequence of this is that the vehicle 7b is supplied only by the voltage source 56b and the vehicle 7c only by the voltage source 55b and they are thus each supplied with only half the energy. The speed of travel which is somewhat reduced in this way can be accepted in view of the considerable advantage that, in comparison with what has been done hitherto (FIG. 3a), all that is required to allow twice the number of vehicles to be operated is different actuation of the switching means (e.g. 57c, 58c, 57b, 58b) and hence a change to the software. The hardware on the other hand can be left unchanged.

The changes which have been specified by way of example for the motor region sections A2a, A2b and the vehicles 7b, 7c may, if required, be made in a plurality of selected motor regions A, in which case this plurality may also comprise all the motor regions present along the track, thus enabling provision to be made, in the ideal case, for twice the vehicle concentration along the entire track. If it is desired for the vehicles to be operated to the normal time-table, provision is made, in the same way as hitherto, for the operating conditions for the various switching means to be as shown in FIGS. 3a and 3b for the vehicle 7a.

Figure 4A:
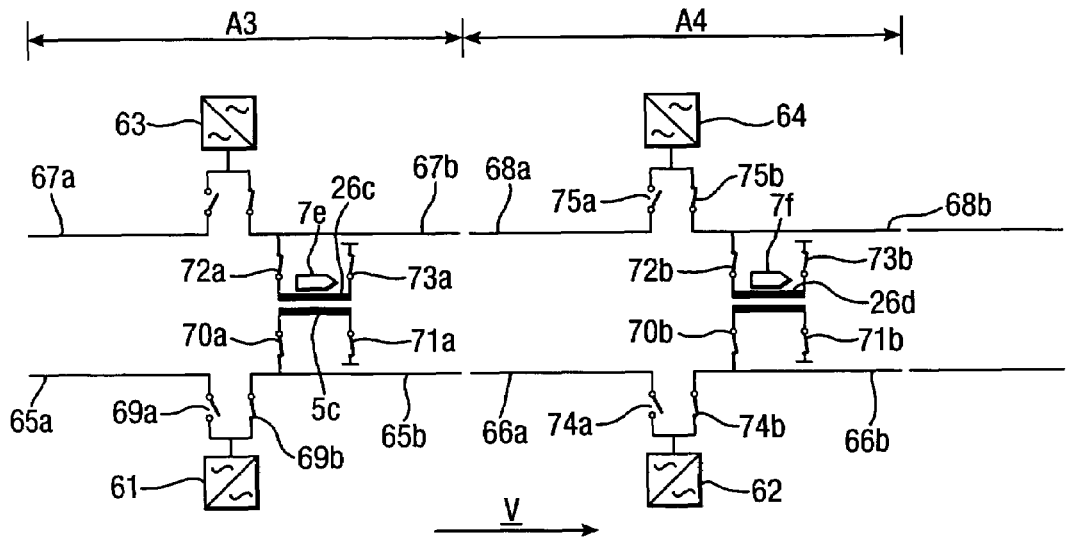
Figure 4B:
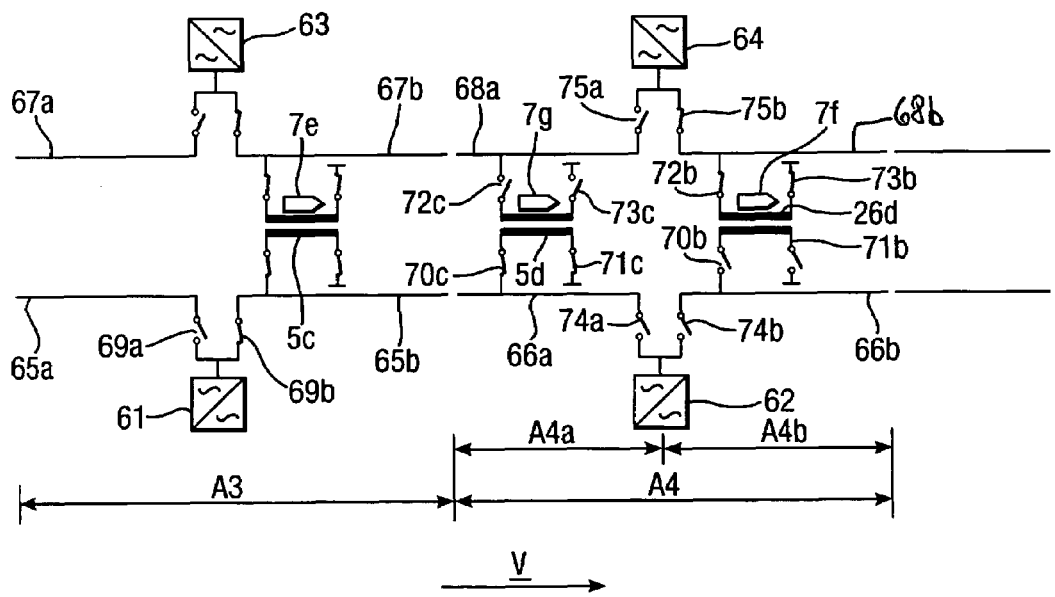

FIGS. 4a and 4b show an embodiment which is operated with a single feed in a similar way to that shown in FIGS. 3a, 3b but in which the voltage sources can be switched over, as desired, to one of two track-segment cables in a similar way to that shown in FIG. 2. In contrast to what is shown there however, voltage sources 61, 62 and 63, 64 are arranged between respective pairs of track-segment cables 65a, 65b and 66a, 66b, and 67a, 67b and 68a, 68b, etc., the track-segment cables 65b, 66a and 67b, 68a being disconnected at their mutually adjacent ends. The voltage source 61 can therefore first be connected to the track-segment cable 65a and disconnected from the track-segment cable 65b, by means of a switching means 69a, 69b. When on the other hand a vehicle 7e has passed through the winding sections connected to the said track-segment cables, the voltage source 61 is connected to the track-segment cable 65b and at the same time is disconnected from the track-segment cable 65a. In the same manner it is possible to connect the voltage sources 63, 64 with the track-segment cables 67a to 68b. This being the case, it is shown in FIG. 4a that the vehicle 7e is being driven at this moment by the winding sections 5c, 26c, which are activated by switching means 70a, 71a and 72a, 73a respectively which are in the closed position.

Because the voltage sources 61 to 64 are each able to supply two different track-segment cables with current, in the case of FIG. 4a a motor region A3 is formed by a voltage source (e.g. 61), two track-segment cables (e.g. 65a, 65b) assigned to the latter, and the winding sections (e.g. 5c) assigned to the track-segment cables. Where there are two linear motors per vehicle, the motor region A3 also contains the voltage source 63, the associated track-segment cables 67a, 67b and the winding sections 26c. The same is true, mutatis mutandis, of a motor region A4. As in the embodiment shown in FIG. 3a, it has therefore been taken, hitherto, as a prerequisite for normal operation that the vehicle 7e may only cross over into the motor region A4 when a preceding vehicle 7f has left the said motor region A4. This is because, in the situation shown in FIG. 4a, the track-segment cables 66a, 68a for example are not available to drive the vehicle 7e as long as the voltage sources 62, 64 are connected to the track-segment cables 66b, 68b and are driving the vehicle 7f.

In accordance with the invention (FIG. 4b), a doubling of the vehicle concentration is achieved by, when required, only operating the vehicles with one or other of the two linear motors, in a similar way to that show in FIG. 3b. This is possible because the motor region A4a and A4b. The motor region section A4a contains in this case the voltage source 62, and associated winding sections 5d, while the motor region section A4b comprises the voltage source 64, the track-segment cable 68b which is situated downstream of the latter in the direction of the arrow v, and associated winding sections 26d. In contrast to FIG. 3b, the motor region sections A4a, A4b are thus situated not one beside the other, but one behind the other in the direction of travel.

The operation of the arrangement shown in FIG. 4b is substantially the same as that in FIG. 3b. If twice the vehicle concentration is wanted, it is ensured by means of the control means 42 (FIG. 2) that, in the motor region section A4a for example, the voltage source 62 is connected by means of a switching means 74a to the track-segment cable 66a belonging to the right-hand side of the motor, whereas the track-segment cable 68a belonging to the left-hand side of the motor is disconnected form the voltage source 64 by means of a switching means 75a which is in the open state. In the succeeding motor region section A4b on the other hand the situation is reversed. In this case, the right-hand track-segment cable 66b is disconnected from the associated voltage source 62 by means of a switching means 74b, while at the same time the left-hand track-segment cable 68b is connected to the voltage source 64 by means of a switching means 75b which is in the closed state. Therefore, in addition to the vehicle 7f which is also shown in FIG. 4a and which, with switching means 72b, 73b closed, travels through the motor region section A4b, a second vehicle 7g can be operated in the motor region section A4a by activating the winding sections 5d with switching means 70c, 71c. The switching means 70b, 71b and corresponding switching means 72c, 73c are in the open state in this case. Where required, it is once again possible for all the motor regions which are present to be sub-divided in the way described. With regard to the distribution of the installed power to the two motor region sections A4a and A4b which exist in each case, the same applies as applied to the motor regions sections A2a and A2b shown in FIG. 3b.

As in the case of FIG. 3b, the arrangement shown in FIG. 4b can be implemented simply by changing the program for the control means 42, i.e. by making a change to the software. Additional hardware components are not required.

FIGS. 5a and 5b show an embodiment having a double-feed and voltage sources and track-segment cables which are permanently assigned. To simplify the figures, all that are shown in this case are the means which are provided on one side of a vehicle, i.e. for one linear motor, because the said means are of a substantially identical form when there are two or more linear motors present for each vehicle.

In FIG. 5a there are for example, as in the mode of operation employed hitherto, four track-segment cables 77a to 77d, one behind the other. The track-segment cables 77b, 77c are each connected, at their ends, to respective pairs of permanently assigned voltage sources 78a, 78b and 79a, 79b. Each track-segment cable (e.g. 77c) also forms, with two connected voltage sources (e.g. 79a, 79b) and associated winding sections (5e), a motor region A5 or A6, in which only one vehicle 7h or 7i at a time can travel, provided on the one hand that the track-segment cables are connected to the assigned voltage sources 79a, 79b, etc. via switching means 80a, 80b etc. and on the other hand that the associated winding sections 5e, etc. are activated via switching means 81a, 81b.

FIG. 5b on the other hand shows how in the case of FIG. 5a an increase in the concentration of vehicles can be achieved by sub-dividing the motor regions A5 and A6. For this purpose, in accordance with the invention the track-segment cables (e.g. 77c) are provided with a disconnecting switch 82, which is usefully situated in a central part of the respective track-segment cable 77c and which, in the closed state, creates a continuous track-segment cable in the way which is shown in FIG. 5b for the track-segment cable 77b and the disconnecting switch 83 arranged therein. When the disconnecting switch 82 is in the open state on the other hand, two mutually independent track-segment cable sections 77c1 and 77c2 are obtained, in which case the track-segment cable section 77c1 for example can be connected by the switching means 80a only to the voltage source 79a and the track-segment cable section 77c2 can be connected by the switching means 80b only to the voltage source 79b.

If, with the arrangement shown in FIG. 5a, a doubling of the vehicle concentration is desired, the disconnecting switches 82 and/or 83 are controlled to the open state by means of the control means 42 (FIG. 2). In addition to the vehicle 7i which, in a similar way to that shown in FIG. 5a, is situated in a motor region section A6b containing the voltage source 79b and the track-segment cable section 73c2, it is then possible for a further vehicle 7j to be moved in a motor region section A6a containing the voltage source 79a and the track-segment cable section 77c1, which is done by connecting the track-segment cable section 77c1 to the voltage source 79a by means of the switching means 80a and activating a corresponding winding section 5f by means of switching means 84a, 84b. The division of the installed power of the voltage sources 79a, 79b which this division of the regions involves is tolerable in a similar way to what was said in connection with FIGS. 3b and 4b. In contrast to FIGS. 3b and 4b, in the present case however the increase in vehicle concentration takes place as a result of a changeover from double feed (FIG. 5a) to single feed (FIG. 5b). As an alternative, or in addition, it is possible for the motor regions to be divided into a left-hand region and a right-hand region (not shown) in a way similar to that shown in FIG. 3b.

Finally, FIGS. 6a and 6b show a further embodiment which, in a similar way to that shown in FIGS. 5a and 5b, provides a double feed but which is provided, in a similar way to that shown in FIGS. 4a and 4b, with converters able to be switched over. Once again, only the means belonging to a single linear motor are shown in this case, because any other linear motors which may be present may be of an identical form.

In FIG. 6a are shown, for example, six track-segment cables 86a to 86f which are arranged one behind the other in the direction of the track, and five voltage sources 87 to 91, which latter can be connected to the track-segment cables 86a to 86f by switching means 92a, 92b and so on to 96a, 96b. If for example the switching means 92b, 93a and 94b, 95a are in the closed state, as shown in FIG. 6a, whereas all the other switching means are in the open state, then the track-segment cables 86b and 86d will be supplied with the preset nominal current and vehicles 7k and 7l can be operated at their nominal speed under the normal conditions which have been preselected. It should be noted in this case that there must not be any current to the track-segment cables 86a, 86c and 86e because the voltage sources 87 to 91 assigned to them are not available to them.

In the state shown, as in the embodiments which have already been described, on the one hand the voltage sources 87, 88 and 89, together with the track-segment cables 86b and 86c assigned to them and associated winding sections 5g, form a first motor region A7, while the voltages sources 89, 90 and 91 on the other hand, together with the assigned track-segment cables 86d and 86e and winding sections 5h able to be connected thereto, form a second motor region A8. If the vehicles 7k and 7l subsequently make their way into the region of those winding sections (not shown) which are connected to the track-segment cables 86c or 86e, the switching means 92b, 93a or 94b, 95a are opened and the switching means 93b, 94a and 95b, 96a are closed in place of them, so that the track-segment cables 86c and 86e are then supplied with current. However, as in the embodiments described previously, the vehicle 7k cannot enter the motor region A8 until the vehicle 7l has left the said motor region A8 and the voltage source 90 is thus available for the vehicle 7k.

FIG. 6b on the other hand shows the way in which the switching means are controlled in accordance with the invention. In this way, the switching means 92b, 93b and 94b for example are in the closed state and the switching means 93a and 94a on the other hand are in the open state. The result of this is that the track-segment cable 86b is supplied with current only by the voltage source 87 and the track-segment cable 86c is supplied with current only by the voltage source 88. This produces on the one hand a first motor region section A7a which contains the voltage source 87, the track-segment cable 86b and the associated winding sections 5g and on the other hand a second motor region section A7b which is independent of the first motor region section A7a and which contains the voltage source 88, the track-segment cable 86c and the associated winding sections 5i. As a result, both the vehicle 7k can travel in the motor region section A7a and also a further vehicle 7m can travel in the motor region A7b, i.e. the vehicle concentration can be doubled in the motor region A7. The rest of the motor regions (e.g. A8) can each be sub-divided into two motor sections in a corresponding way.

In this embodiment too, the increase in the vehicle concentration takes place as a result of a changeover from a double feed (FIG. 6a) to a single feed (FIG. 6b). As in the case of the other arrangements described, the loss of drive power which this causes can be accepted. Also, a particular advantage of the arrangement shown in FIG. 6b arises from the fact that, in contrast to FIG. 5b, no additional disconnecting switches 82, 83 are required. Otherwise, all that is required to implement the arrangement shown in FIG. 6b is for the switching means to be controlled by means of the control means 42 (FIG. 2) in a different way from hitherto, i.e. no additional expenditure on hardware is required.

The invention is not limited to the embodiments which have been described, which can be modified in many ways. In particular, to avoid losses of thrust if changeover points between the individual winding sections are overrun, all the provisions which have become known to date for this purpose, which are known as leapfrog, alternating step, three-step or four-step processes (e.g. the magazine elektrotechnische Zeitschrift etz, Vol. 108, 1987, No. 9, pp. 378 to 381, DE 199 22 441 A1, DE 102 27 253 A1), may be made. Similar provisions could be made for the changeover of the track-segment cables. Further, it is of course also possible for the invention to be applied to arrangements in which the voltage sources are connected, as in FIG. 2, to the track-segment cables in such a way that, as shown in FIGS. 3 and 4, only the track-segment cables 19, 22 or the track-segment cables 33, 34 are used alternately to drive the vehicles 7. The switching means and control means described, and the stipulations made regarding the different motor regions or motor region sections may also be different from those described. Finally, it is understood that the various features may also be applied in combinations other than those described and shown.

It will be understood, that each of the elements described above or two or more together, may also find a useful application in other types of construction differing from the types described above.

While the invention has been illustrated and described as embodied in a magnetic leviation (maglev) arrangement and an operating method therefor, it is not intended to be limited to the details shown, since various modifications and structural changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims;

1. Method of operating a magnetically levitated vehicle by means of an arrangement having at least one long-stator linear motor, which arrangement comprises at least one a.c. winding (5, 26) which is laid out longitudinally of a track and is sub-divided into winding sections (5.1 to 5.9, 26.1 to 26.9), an exciter arrangement (6) which is mounted on said vehicle (7), track-segment cables (51, 52; 65 to 68; 77; 86) arranged longitudinally of said track and voltage sources (55, 56; 61 to 64; 78, 79; 87 to 91) assigned to said track-segment cables (51, 52; 65 to 68; 77, 86), said winding sections (5.1 to 5.9, 26.1 to 26.9) being connected to assigned ones of said track-segment cables (51, 52; 64 to 86; 77; 86) and voltage sources (55, 56, 61 to 64; 78, 79; 87 to 91) in line with a movement of said vehicle (7), and said track-segment cables (51, 52; 65 to 68; 77; 86), said winding sections (5.1 to 5.9, 26.1 to 26.9) and said voltage sources (55, 56, 61 to 64; 78, 79; 87 to 91) being so assigned to motor regions (A) which follow one another along said track that, under normal operating conditions, only one vehicle (7) is operated in each motor region (A) at a power which is preset for said motor region (A) and is supplied by said assigned voltage sources (55, 56, 61 to 64; 78, 79; 87 to 91), wherein, to increase a vehicle concentration along the track, selected motor regions (A2, A4, A6, A7) are sub-divided into at least two mutually independent motor region sections (A2a, A2b; A4a, A4b; A6a, A6b; A7a, A7b), and wherein vehicles (7) being operated in said motor region sections (A2a, A2b; A4a, A4b; A6a, A6b; A7a, A7b) are moved at a part of that power which is preset for each motor region (A).

2. Method according to claim 1, wherein, when there are motor regions (A6, A7) having a double feed for said track-segment cables (77, 86), a division into two motor region sections (A6a, A6b; A7a, A7b) is made by changing over from double feed to single feed in these motor regions (A6, A7).

3. Method according to claim 2, wherein, for the changeover from double feed to single feed, said track-segment cables (77b, 77c) concerned are provided with disconnecting switches (82, 83) and wherein said switches (82, 83) are brought to an open state.

4. Method according to claim 2, wherein, for the changeover from double feed to single feed, said track-segment cables (86) are each connected to only one of two assigned voltage sources (87 to 91).

5. Method according to claim 1, wherein, in the case of vehicles (7) which have at least two mutually independent long-stator linear motors, a division into at least two motor region sections (A2a, A2b; A4a, A4b) is made by assigning only one of said linear motors to each motor region section (A2a, A2b; A4a, A4b).

6. Method according to claim 5, wherein, in the case of motor regions (A4) having a single feed for said track-segment cables (65 to 68), the assignment is performed essentially by means of switching means (69, 74, 75) which connect said track-segment cables (65 to 68) to selected voltage sources (61 to 64).

7. Method according to claim 5, wherein, in the case of motor regions (A2) having a single feed for said track-segment cables (51, 52), the assignment is performed essentially by means of switching means (57, 58) which connect said winding sections (5b1, 26b1; 5b2, 26b2) to selected track-segment cables (51, 52).

8. Arrangement having at least one long-stator linear motor for a magnetically levitated vehicle, comprising: at least one a.c. winding (5, 26) which is laid out longitudinally of a track and is sub-divided into winding sections (5.1 to 5.9, 26.1 to 26.9), an exciter arrangement (6) which is mounted on said vehicle (7), track-segment cables (51, 52; 65 to 68; 77; 86) arranged longitudinally of said track, voltage sources (55, 56; 61 to 65; 78, 79; 87 to 91) arranged at a distance longitudinally of said track, control means (42) for connecting said winding sections (5.1 to 5.9, 26.1 to 26.9) in succession to assigned ones of said track-segment cables (51, 52; 65 to 68; 77; 86) and voltage sources (55, 56; 61 to 64; 77, 79; 87 to 91) in line with a movement of said vehicle (7), and motor regions (A) which follow one another in a direction of said track and which are formed by assigned ones of said winding sections (5.1 to 5.9, 26.1 to 26.9), track-segment cables (51, 52; 65 to 68; 77; 86) and voltage sources (55, 56; 61 to 64; 78, 79; 87 to 91), wherein in each motor region (A), under normal operating conditions, only one vehicle (7) can be operated, at a power which is preset for a motor section (A) concerned and being supplied by said assigned voltage sources (55, 56; 61 to 64; 78, 79; 87 to 91), and wherein, to increase the vehicle concentration along the track, selected motor regions (A2, A4, A6, A7) can be sub-divided into at least two mutually independent motor region sections (A2a, A2b; A4a, A4b; A6a, A6b; A7a, A7b), in such a way that vehicles (7) being operated in said motor region sections (A2a, A2b; A4a, A4b; A6a, A6b; A7a, A7b) can be moved at a part of that power which is preset for each motor region (A).

9. Arrangement according to claim 8, wherein said motor regions (A3, A4; A7, A8) contain track-segment cables (65, 67; 86) which can each be connected to two voltage sources (61 to 64, 87 to 91) via switching means (69, 74, 75; 92 to 96), and wherein said control means (42) are so arranged that said track-segment cables (65, 67; 86) are connected by means of said switching means (69, 74, 75; 92 to 96) to only one of said two voltage sources (61 to 64; 87 to 91), as selected.

10. Arrangement according to claim 8, wherein said motor regions (A5, A6) contain track-segment cables (77) which are each permanently assigned to two voltage sources (78, 79) and have disconnecting switches (82, 83) fitted in them, and wherein said control means (42) are so arranged that, by actuating said disconnecting switches (82, 84), said track-segment cables (77) can be sub-divided into two mutually independent track-segment cable sections (77c1, 77c2) which are each connected to only one of said assigned voltage sources (78, 79).

11. Arrangement according to one of claims 8, 9 or 10 and further comprising at least two long-stator linear motors and two motor region sections (A2a, A2b; A4a, A4b) for each motor region (A), wherein said switching means (57 to 59; 70 to 73) are so provided that each vehicle (7b, 7c, 7f, 7g) can be operated by only one of said two motor region sections (A2a, A2b; A4a, A4b).

12. Arrangement according to claim 11, wherein said motor regions (A2) contain track-segment cables (51, 52) which are each assigned to an assigned voltage source (55, 56) by means of said switching means (57 to 59), and wherein said control means (42) are so arranged that said motor region sections (A2a, A2b) are situated one beside the other and said vehicles (7b, 7c) can be operated alternately by means of said track-segment cables (51, 52) belonging to one or other of said linear motors.

13. Arrangement according to claim 12, wherein said switching means (57 to 59) are arranged for connection of said winding sections (5b1, 26b1; 5b2, 26b2) to one or other of said track-segment cables (51, 52), as desired.

14. Arrangement according to claim 11, wherein said motor regions (A3, A4) have track-segment cables (66, 68) which can be connected as desired to assigned voltage sources (61 to 64) by means of switching means (69, 74, 75), and wherein said control means (42) are so arranged that said motor region sections (A4*a*, A4*b*) are situated one behind the other and said vehicles (7*f*, 7*g*) can be operated by means of said track-segment cable (66, 68) belonging to one or other of said linear motors alternately.

15. Arrangement according to claim 14, wherein said switching means (69, 74, 75) are arranged to connect only said track-segment cable (66, 68) belonging to one of said linear motors to an assigned voltage source (62, 64) in each motor region section (A4*a*, A4*b*).

* * * * *